Sept. 14, 1954 — F. HOCHMAYR — 2,688,911
ELECTRICALLY HEATED EXPRESSO MACHINE FOR THE PREPARATION OF COFFEE, TEA, OR THE LIKE
Filed Feb. 4, 1953 — 4 Sheets-Sheet 1

INVENTOR.
FRANZ HOCHMAYR
BY

Sept. 14, 1954 F. HOCHMAYR 2,688,911
ELECTRICALLY HEATED EXPRESSO MACHINE FOR THE
PREPARATION OF COFFEE, TEA, OR THE LIKE
Filed Feb. 4, 1953 4 Sheets-Sheet 2

INVENTOR.
FRANZ HOCHMAYR
BY

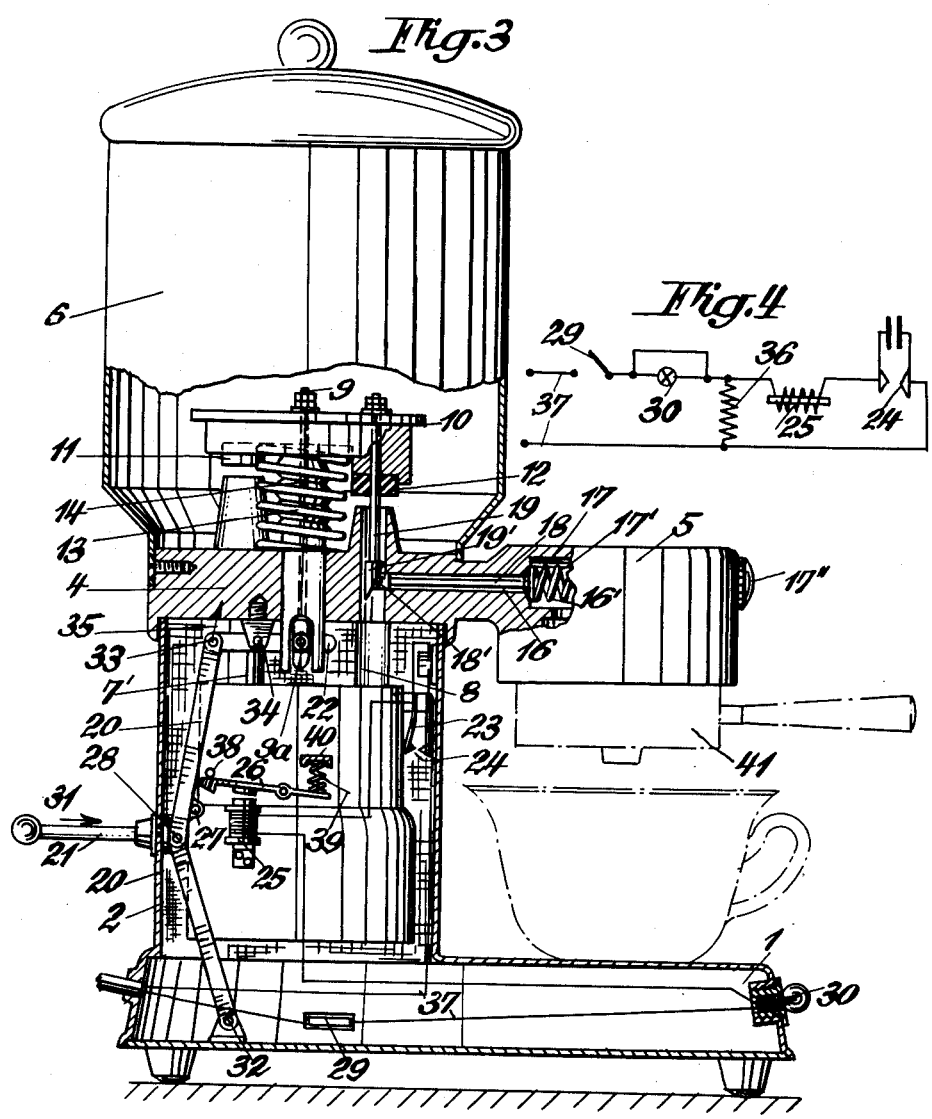

Sept. 14, 1954  F. HOCHMAYR  2,688,911
ELECTRICALLY HEATED EXPRESSO MACHINE FOR THE
PREPARATION OF COFFEE, TEA, OR THE LIKE
Filed Feb. 4, 1953  4 Sheets-Sheet 4

INVENTOR.
FRANZ HOCHMAYR
BY

Patented Sept. 14, 1954

2,688,911

UNITED STATES PATENT OFFICE 2,688,911

ELECTRICALLY HEATED EXPRESSO MACHINE FOR THE PREPARATION OF COFFEE, TEA, OR THE LIKE

Franz Hochmayr, Vienna, Austria

Application February 4, 1953, Serial No. 335,125

Claims priority, application Austria February 22, 1952

4 Claims. (Cl. 99—305)

Electrically heated Espresso machines are known for the preparation of coffee, tea, or the like (Austrian Patent No. 168,405), in which a water reservoir is arranged over the electrically heated boiler. In that case the water supply to the boiler was enabled by one or several connection lines controlled by a type of rotary slide valve, the operation of which caused at the same time the connection or disconnection of the current for heating the boiler.

The invention has the primary object to reduce the time for preparing coffee, tea, or the like with the same load on the heating resistor, and resides essentially in the fact that during the use of the machine the uninterrupted heating of the boiler is enabled because in the time when no percolation takes place the boiler is connected to the water reservoir in such a manner as to enable a natural circulation of water. Thus the period where no percolation takes place is utilized for preheating the water which is contained in the reservoir and which will then enter the boiler at a correspondingly elevated temperature, to assume the necesary temperature, of 100 deg. C., more quickly without requiring an intermittent higher loading of the heating elements to obtain a quicker sequence of percolation cycles.

Figure 1:
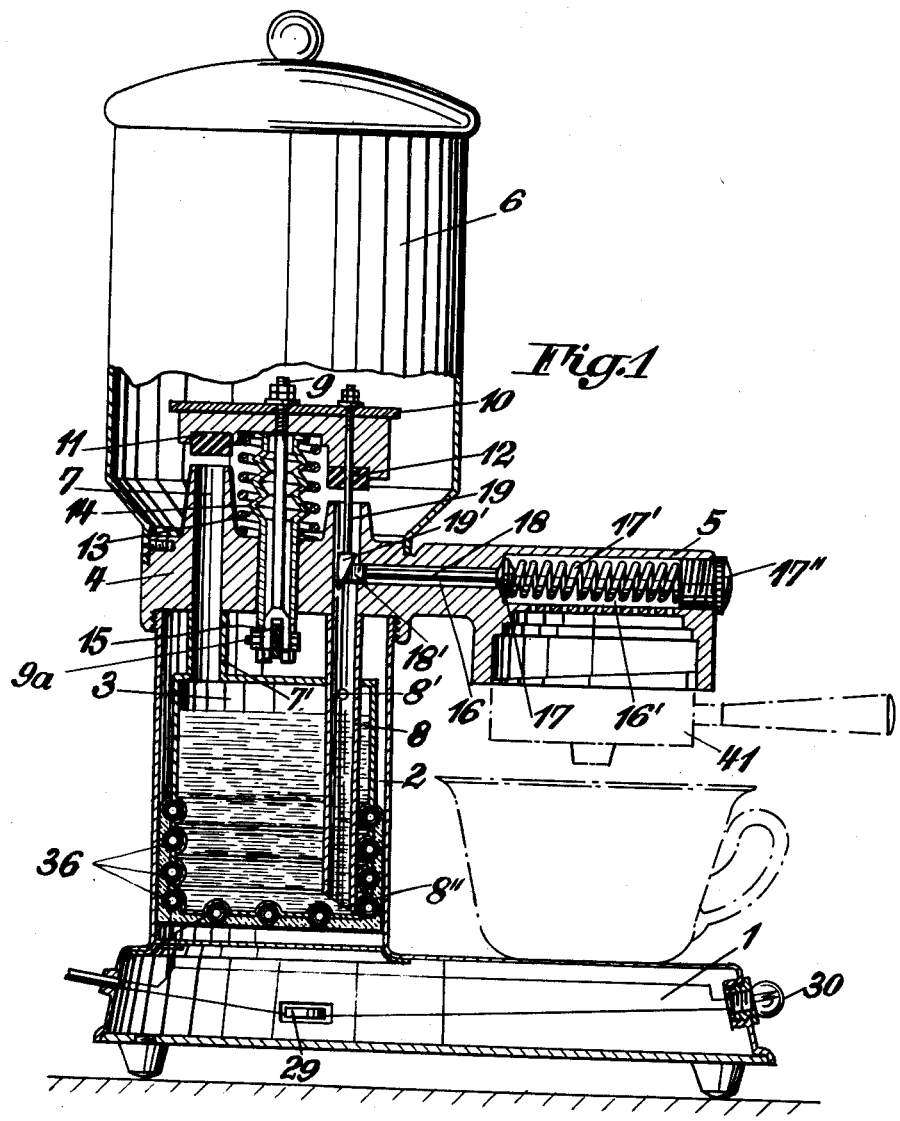
Figure 2:
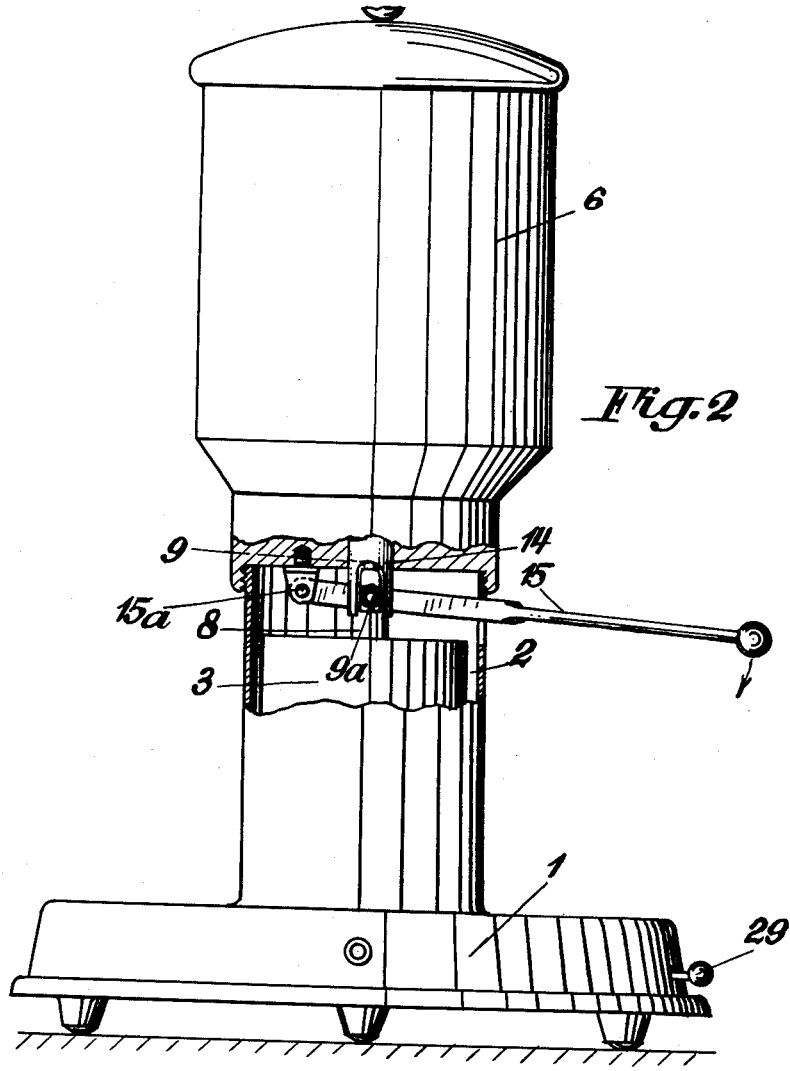

In the drawing an example of an Espresso machine embodying the invention is illustrated, in which Figs. 1 and 2 show a form suitable for smaller households, in a vertical sectional view taken through the water reservoir, the boiler and the tap for carrying the filter unit for ground coffee, and in a side view with exposed opeating mechanism, respectively.

Figure 5:
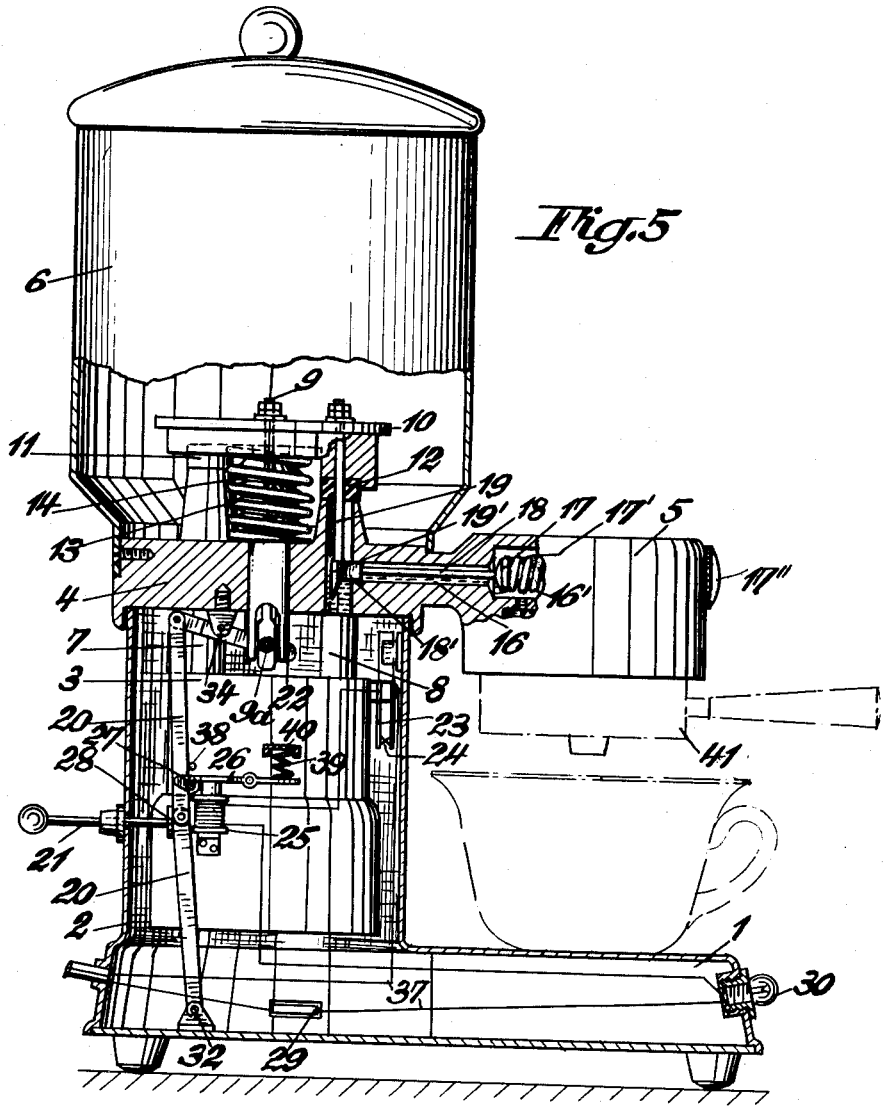

A second embodiment of the Espresso machine, with automatic disconnection for commercial establishments, is shown in Figs. 3 and 5, in two different control positions of the valve control, in vertical section.

Fig. 4 is a diagram of connections of the electrical elements of the Espresso machine.

The Espresso machine according to Fig. 1 has a cylindrical casing 2, which is mounted on the base 1 and accommodates a boiler 3 provided with an electric heater 36. On top the casing 2 is closed by a partition 4, forming an integral casting with the tap 5. The partition 4 has watertightly mounted thereon a water reservoir 6, which is connected with the boiler 3 by two conduits 7 and 8 vertically extending through plate 4. A duct 16 horizontally branching from conduit 8 and leading into tap 5 connects the latter with boiler 3. The socket pipe 7' provides a watertight, rigid connection between conduit 7 of partition 4 and boiler 3, conduit 7 extending somewhat into the boiler from the top and projecting with its top end somewhat beyond the top end of conduit 8. Thus a steam cushion can form in the boiler 3 below the top thereof.

Conduit 8 of plate 4 is downwardly continued by a pipe which extends steam-tightly through the top of boiler 3 down to the bottom of the boiler and is adapted to take up water from the hottest zone of boiler 3 through an inlet 8'' arranged at an acute angle to the pipe axis. Conduits 7 and 8 are closed tightly at their top openings by a valve plate 10 when the water in boiler 3 is to be brought to boiling temperature and to be discharged through conduit 8 and duct 16 to the coffee filtering unit by the steam pressure produced in boiler 3. Just below the top of the boiler the conduit 8 is formed with a pinhole 8', through which small increments of steam can enter the conduit 8. The pinhole 8' being much smaller than the inlet 8'' at the lower end of the pipe, the steam pressure will mainly raise hot water in conduit 8 when the top openings of conduits 7 and 8 are closed, whereas only a smaller amount of steam will enter the conduit 8 through bore 8'. That amount will be sufficient, however, to give a creamy appearance to the coffee liquid discharged from the filter.

For closing the top openings of conduits 7 and 8 the valve plate 10 has packing pieces 11 and 12, respectively, of rubber or another, equivalent packing material. By means of a control rod 9 arranged centrally relative of the plate and extending vertically and with a clearance through a bore in partition 4, the plate 10 is either pressed against or lifted from the openings of conduits 7, 8.

Valve plate 10 is loaded by a spring 13 firmly bearing against partition 4 and tending to lift valve plate 10 from the openings of conduits 7, 8. A one-armed hand lever 15, which is conneted to pivot pin 9a at the lower end of rod 9, and is pivotally movable vertically about a stationary pivot pin 15a fixed to the underside of partition 4, serves to move the valve plate 10 against the openings of conduits 7 and 8; owing to the counterpressure of spring 13 the plate 10 will remain in its closed position only as long as the hand pressure on hand lever 15 is maintained. The water reservoir 6 is sealed from the bore provided in partition 4 for the passage of rod 9 by a bellows-type rubber sleeve 14, which is watertightly fixed to the underside of valve plate 10 and merges into a hose firmly and tightly fitting in the bore of partition 4.

Duct 16, which branches horizontally from conduit 8 and leads into tap 5, opens into a valve 17, which is arranged in a duct portion 16' of enlarged cross section and closes the outlet of duct 16 under the pressure of spring 17' fitted in duct 16' and bearing on a screw plug 17'' sealing duct 16' from the outside. The valve disk of valve 17 has a valve stem 18, which centrically extends longitudinally in duct 16, with considerable clearance, and carries at the end of the stem a flat wedge 18' upstanding in conduit 8. With its wedge surface that wedge 18' bears on a countersurface of a wedge 19', which is movable in conduit 8 and rigidly connected to valve plate 10 by rod 19. When the valve plate 10 is lifted, valve 17 is closed by the pressure of spring 17' so that no water can enter the tap 5.

As shown in Fig. 4, the heating coil 36 of boiler 3 is connected to the mains by line 37, which includes a one-pole electric switch 29 and a signal lamp 30 in series with the heating coil. Hence, the electric heater of boiler 3 is connected and disconnected by switch 29 and its connected condition is indicated by the lighting of the signal lamp.

At the beginning of the operation, the heating circuit is closed by switch 29; the signal lamp 30 lights to indicate that the apparatus is ready for use. When the heating circuit 37 is closed, the heating coil 36 heats the boiler 3 so that the water therein is heated too. By natural circulation the water is heated in boiler 3 rises in conduit 7 and sinks in conduit 8 so that the water in the reservoir 6 is likewise heated. After the filter unit 41 (indicated with dash-and-dot lines) filled with coffee or the like, has been connected to tap 5, the lever 15 is operated to seat valve plate 10 with its sealing surfaces on the opening of conduits 7 and 8, which are thus closed. At the same time valve 17 is opened due to the action of wedges 18', 19'. Within about 20 seconds, steam is generated in boiler 3 and by its pressure expels the water, together with a small amount of steam entering conduit 8 through hole 8', through duct 16 and forces it through the coffee in the filter unit. When lever 15 is released, the spring-loaded valve plate 10 automatically opens conduits 7 and 8 so that boiler 3 fills and the circulation of water is resumed.

In larger commercial establishments only big, automatic Espresso machines, mostly whole batteries thereof, are used, which should be operated by a single person. For this reason the operation must be reduced to a minimum of manipulations. In particular, the moment when the necessary temperature has been reached in the boiler must be recognized so that the preparation and discharge of the beverage are effected in time.

For this reason the embodiment of the machine shown in Figs. 3 and 5 comprises instead of lever 15 a toggle joint 20, 20', which can be moved in the sense of arrow 31 from the position shown in Fig. 3 to the stop 38 (Fig. 5) almost to the aligned operative position, by means of a rod 21 extending out of the quadrangular casing 2. In the latter position the toggle joint 20, 20' is held by means of a pin 27 attached to one of its levers 20, and a latch 26 interlocking therewith. Latch 26 is loaded by a spring 39, which tends to maintain the latch in the position of disengagement and is supported on an abutment formed in the casing 2. The arm of latch 26 which is formed with a catch constitutes an armature under the influence of the electromagnet 25. The electromagnet is fixedly arranged in casing 2 and, as shown in Fig. 4, is connected together with a bimetallic element contact 24, bridged by a capacitor, in the circuit 37 of the heating coil 36 of boiler 3. In its normal position the bimetallic strip of contact 24 closes the latter, as is shown in Fig. 5, and with it the circuit of electromagnet 25. As long as electromagnet 25 is energized, i. e., when switch 29 is closed, latch 26 is in its locking position ready to interlock with 27 of the toggle joint when the latter is moved by button 21 in the direction of arrow 31 from the position of Fig. 3 into the position of Fig. 5. One lever of the toggle joint is pivotally connected to a stationary eye lug 32, the other lever is pivotally connected to a two-armed lever 22 by a pivot pin 33. That lever 22 is pivotally movable in a vertical plane about pivot pin 34 of a bearing bracket attached to the underside of partition 4, and with its second arm extends into a slot formed according to the cross section in rod 9, which carries valve plate 10. Thus the toggle joint and lever 22 are coupled with the rod 9, and levers 20 and 22 are loaded by spring 13 connected to valve plate 10 and tending to maintain levers 20, 22 in their inoperative position, shown in Fig. 3. In that position the valve plate 10 is lifted from the opening of conduits 7, 8 by the pressure of spring 13.

This device has the following mode of operation: When cold water is in the reservoir and boiler 3 and the switch 29 has been moved to its closing position, the signal lamp 30 will light to indicate that the heater 36 of the boiler is connected. After a short while the water in the boiler will have reached the necessary boiling temperature. Now rod 21 is depressed to move the toggle joint in the direction of arrow 31 from the position of Fig. 3 into the expanded position of Fig. 5. In that position the toggle joint is held by the latch 26 of electromagnet 25, which latch catches pin 27. Thus the valve plate 10 urged against the openings of conduits 7, 8 by the movement of toggle joint 20, 20' is held in its closing position. As a result the water in boiler 3 is separated from the water supply in reservoir 6 and a steam cushion will form in the boiler soon. That steam cushion exerts pressure on the water level to force hot water through conduits 8 and duct 16 out into tap 5 and farther through the coffee filtering unit 41. The ratio of the internal width of conduit 8 to the surface area of the water level in the boiler and to the width of hole 8' is chosen so that the steam pressure exerted on the water level in boiler 3 is sufficient to convey hot water safely through the coffee filtering unit 41, to a limit which is determined by the lower conduit opening 8''. The cross-sectional area of hole 8' in conduit 8 is such that steam can enter through that hole only in the optimum proportion relative to the water, as is required to obtain a foamy discharge of coffee. As soon as the steam in the boiler has pressed the water through conduit 8 and only a quantity of water, determined by the lower opening 8'', remains in the boiler for continued evaporation, the same will be heated by the electric heating wire rapidly to a temperature which causes the bimetallic strip 23, contacting the boiler, to open the electric contacts 24 and thus to open the circuit 37 of coil 25 of the electromagnet. The latter will then release the latch 26, which under the action of its spring 39 immediately swings into its inoperative position to retract its catch from the pin 27 of the toggle joint 20, 20'. Under the action of spring 13, the toggle joint, the lever 22, and rod 9 and the valve plate 10 will then move immediately into their respective initial positions, shown in Fig. 3, in which the openings of conduits 7 and 8 are exposed so that water can flow from the reservoir into the boiler 3 and the cycle described can be repeated. Obviously the coffee filtering unit 41 can be exchanged as often as required, independently of the cycle of the apparatus.

I claim:

1. In an electrically heated brewing machine, an electrically heated boiler having a shell, a top and a bottom, an electric heater built into said shell, a partition upwardly spaced from the boiler and carrying a tap, a water reservoir standing on the partition, two conduits each having an opening in the water reservoir and extending through the partition into the boiler, one of said conduits opening closely below the top of the boiler, the other extending close to the bottom of the boiler and adapted to discharge hot water under steam pressure, a vertically movable valve plate adapted to close said openings of said two conduits in the water reservoir to prevent a circulation of water between the boiler and the water reservoir, a valve spring connected to the valve plate and arranged to urge it into its open position, a lever pivotally connected to said partition for movement in a vertical plane, a rod pivotally connecting the lever with the valve plate and adapted to urge said valve plate against said openings of the two conduits against the force of the spring, a horizontal duct branching from the conduit extending close to the bottom of the boiler, said horizontal duct leading through the tap and adapted to discharge hot water and steam, a filter unit adapted to hold finely ground coffee and easily detachably connected to the tap and communicating with said horizontal duct, a valve fitted in said horizontal duct, a control for said valve, said control being operatively connected to the valve plate to open said valve when the valve plate is in closing position and to close said valve immediately when the valve plate is lifted under the pressure of said spring to open said conduits for the flow of water from the water reservoir into the boiler.

2. In an electrically heated brewing machine, an electrically heated boiler having a shell, a top and a bottom, an electric heater built into said shell, a partition upwardly spaced from the boiler and carrying a tap, a water reservoir standing on the partition, two conduits each having an opening in the water reservoir and extending through the partition into the boiler, one of said conduits opening closely below the top of the boiler, the other extending close to the bottom of the boiler and adapted to discharge hot water under steam pressure, a vertically movable valve plate adapted to close said openings of said two conduits in the water reservoir to prevent a circulation of water between the boiler and the water reservoir, a valve spring connected to the valve plate and arranged to urge it into its open position, a lever pivotally connected to said partition for movement in a vertical plane, a rod pivotally connecting the lever with the valve plate and adapted to urge said valve plate against said openings of the two conduits against the force of the spring, a horizontal duct branching from the conduit extending close to the bottom of the boiler, said horizontal duct leading through the tap and adapted to discharge hot water and steam, a filter unit adapted to hold finely ground coffee and easily detachably connected to the tap and communicating with said horizontal duct, a valve fitted in said horizontal duct, a wedge longitudinally movably inserted in the conduit extending close to the bottom of the boiler, a rod rigidly connecting the wedge with the valve plate, said valve having a valve stem longitudinally movable in said horizontal duct, a control member arranged at one end of said valve stem and extending into the range of said wedge to be operated thereby in order to open the valve in the horizontal duct.

3. In an electrically heated brewing machine, an electrically heated boiler having a shell, a top and a bottom, an electric heater built into said shell, a partition upwardly spaced from the boiler and carrying a tap, a water reservoir standing on the partition, two conduits each having an opening in the water reservoir and extending through the partition into the boiler, one of said conduits opening closely below the top of the boiler, the other extending close to the bottom of the boiler and adapted to discharge hot water under steam pressure, the conduit extending close to the bottom of the boiler being formed with a pinhole just below the top of the boiler, for the admixture of steam to hot water rising in said conduit, a vertically movable valve plate adapted to close said openings of said two conduits in the water reservoir to prevent a circulation of water between the boiler and the water reservoir, a valve spring connected to the valve plate and arranged to urge it into its open position, a lever pivotally connected to said partition for movement in a vertical plane, a rod pivotally connecting the lever with the valve plate and adapted to urge said valve plate against said openings of the two conduits against the force of the spring, a horizontal duct branching from the conduit extending close to the bottom of the boiler, said horizontal duct leading through the tap and adapted to discharge hot water and steam, a filter unit adapted to hold finely ground coffee and easily detachably connected to the tap and communicating with said horizontal duct, a valve fitted in said horizontal duct, a control for said valve, said control being operatively connected to the valve plate to open said valve when the valve plate is in closing position and to close said valve immediately when the valve plate is lifted under the pressure of said spring to open said conduits for the flow of water from the water reservoir into the boiler.

4. In an electrically heated brewing machine, an electrically heated boiler having a shell, a top and a bottom, an electric heater built into said shell, a partition upwardly spaced from the boiler and carrying a tap, a water reservoir standing on the partition, two conduits each having an opening in the water reservoir and extending through the partition into the boiler, one of said conduits opening closely below the top of the boiler, the other extending close to the bottom of the boiler and adapted to discharge hot water under steam pressure, a vertically movable valve plate adapted to close said openings of said two conduits in the water reservoir to prevent a circulation of water between the boiler and the water reservoir, a valve spring connected to the valve plate and arranged to urge it into its open position, a lever pivotally connected to said partition for movement in a vertical plane, a rod pivotally connecting the lever with the valve plate and adapted to urge said valve plate against said openings of the two conduits against the force of the spring, a toggle joint pivotally connected to the lever, a button rod connected to the toggle joint and adapted to expand it against the action of the spring connected to said valve plate, locking means arranged to prevent a return of the toggle joint out of its expanded position and the lifting of the valve plate from its closing position under the force of said spring, an electromagnet in circuit with said electric heater and adapted to hold said locking means in locking position, a bimetallic contact element connected to the boiler and series-connected in circuit with the electromagnet, said bimetallic contact element being adapted to open said circuit when owing to lack of water in the boiler the temperature rises above 100 deg. C., to cause said electromagnet to release said locking means and thus to release said toggle joint and the valve plate for automatical return into their respective initial positions under the force of said valve spring, a horizontal duct branching from the conduit extending close to the bottom of the boiler, said horizontal duct leading through the tap and adapted to discharge hot water and steam, a filter unit adapted to hold finely ground coffee and easily detachably connected to the tap and communicating with said horizontal duct, a valve fitted in said horizontal duct, a control for said valve, said control being operatively connected to the valve plate to open said valve when the valve plate is in closing position and to close said valve immediately when the valve plate is lifted under the pressure of said spring to open said conduits for the flow of water from the water reservoir into the boiler.

References Cited in the file of this patent

UNITED STATES PATENTS

| Number | Name | Date |
|---|---|---|
| 1,389,628 | Clark | Sept. 6, 1921 |
| 1,459,408 | Lockett | June 19, 1923 |

FOREIGN PATENTS

| Number | Country | Date |
|---|---|---|
| 168,405 | Austria | June 11, 1951 |